United States Patent
Cordwell et al.

(10) Patent No.: US 9,127,178 B2
(45) Date of Patent: Sep. 8, 2015

(54) INKS AND PRINTING PROCESS

(75) Inventors: Janette Cordwell, Manchester (GB);
Philip Double, Manchester (GB);
Martin Edwards, Manchester (GB);
Daniel Morris, Manchester (GB); Alan Hopper, Manchester (GB)

(73) Assignee: Fujifilm Imaging Colorants, Inc., New Castle, DE (US)

(*) Notice: Subject to any disclaimer, the term of this patent is extended or adjusted under 35 U.S.C. 154(b) by 91 days.

(21) Appl. No.: 13/995,988

(22) PCT Filed: Dec. 15, 2011

(86) PCT No.: PCT/GB2011/052483
§ 371 (c)(1),
(2), (4) Date: Jun. 20, 2013

(87) PCT Pub. No.: WO2012/085541
PCT Pub. Date: Jun. 28, 2012

(65) Prior Publication Data
US 2013/0286119 A1   Oct. 31, 2013

(30) Foreign Application Priority Data
Dec. 21, 2010   (GB) .................................. 1021603.4

(51) Int. Cl.
| | |
|---|---|
| *C09D 11/02* | (2014.01) |
| *C09D 11/30* | (2014.01) |
| *B01J 13/14* | (2006.01) |
| *C09B 67/08* | (2006.01) |
| *C09C 1/56* | (2006.01) |
| *C09D 11/326* | (2014.01) |
| *C09B 67/46* | (2006.01) |
| *C09B 67/02* | (2006.01) |
| *B41J 2/21* | (2006.01) |
| *B82Y 30/00* | (2011.01) |

(52) U.S. Cl.
CPC ................. *C09D 11/30* (2013.01); *B01J 13/14* (2013.01); *B41J 2/2107* (2013.01); *B82Y 30/00* (2013.01); *C09B 67/009* (2013.01); *C09B 67/0013* (2013.01); *C09B 67/0097* (2013.01); *C09C 1/56* (2013.01); *C09D 11/326* (2013.01); *C01P 2004/62* (2013.01); *C01P 2004/64* (2013.01)

(58) Field of Classification Search
CPC .............................. C09D 11/30; C09D 11/326
USPC ........................................................ 106/31.6
See application file for complete search history.

(56) References Cited

U.S. PATENT DOCUMENTS

| | | | |
|---|---|---|---|
| 6,498,202 B1 | 12/2002 | Sun et al. | |
| 6,538,047 B1 | 3/2003 | Miyabayashi | |
| 6,663,455 B1 | 12/2003 | Lang | |
| 2004/0032473 A1* | 2/2004 | Ishimoto et al. | 347/100 |
| 2008/0002004 A1 | 1/2008 | O'Donnell et al. | |
| 2009/0202724 A1 | 8/2009 | Arai et al. | |
| 2009/0281240 A1* | 11/2009 | Li et al. | 524/590 |
| 2009/0291215 A1* | 11/2009 | Makuta et al. | 427/256 |
| 2009/0322842 A1 | 12/2009 | Kosydar et al. | |
| 2011/0014439 A1 | 1/2011 | Joshi et al. | |
| 2011/0169900 A1 | 7/2011 | Annable et al. | |
| 2013/0225739 A1* | 8/2013 | Spinelli | 524/365 |

FOREIGN PATENT DOCUMENTS

| | | |
|---|---|---|
| EP | 2090627 A1 | 2/2009 |
| EP | 2123461 A1 | 5/2009 |

* cited by examiner

*Primary Examiner* — Veronica F Faison
(74) *Attorney, Agent, or Firm* — Banner & Witcoff, Ltd.

(57) ABSTRACT

A process for printing a substrate comprising applying thereto an ink by means of an ink jet printer, wherein the ink comprises a latex binder, a liquid medium comprising water and organic solvent, and polymer-encapsulated pigment particles comprising a carboxy-functional dispersant crosslinked around a pigment core by a crosslinking agent, wherein the ink has a minimum film-forming temperature below 70° C. Inks are also claimed. The process and inks are useful for printing temperature-sensitive substrates, e.g. foil balloons and wrapping materials for special occasions.

17 Claims, No Drawings

INKS AND PRINTING PROCESS

RELATED APPLICATION DATA

This application is a National Stage Application under 35 U.S.C. 371 of co-pending PCT application PCT/GB2011/052483 designating the United States and filed Dec. 15, 2011; which claims the benefit of GB patent application number 1021603.4 and filed Dec. 21, 2010 each of which are hereby incorporated by reference in their entireties.

This invention relates to inks, to a process for ink jet printing and to ink jet printers and tanks.

Ink jet printing ("IJP") is a non-impact printing technique in which droplets of an ink are ejected through fine nozzles onto a substrate without bringing the nozzles into contact with the substrate.

Inks used for ink jet printing should be stable to storage over time without decomposing or forming a precipitate which could block the fine nozzles.

The design of inks for ink jet printing substrates having low or no absorbency (e.g. plastics) is particularly challenging. It can be difficult to make inks adhere to non-absorbent substrates because the ink may just sit on the surface as a bead or it may run-off the surface. Polymeric substrates repel many aqueous inks. For flexible surfaces the additional problem exists whereby the ink, after drying, has low adhesion to the substrate and low flexibility. The dried ink may crack, resulting in the print losing its gloss or, in extreme cases, parts of the print may fall off the substrate.

There is a large market for foil balloons and wrapping materials carrying personalized messages and/or images for parties and special occasions. The balloons are often filled with helium and used to decorate a venue. The wrapping materials are flexible and are wrapped around gifts to hide their identity, increasing excitement for the recipient, particularly when the wrapping is personalized. However the foil balloons and wrapping materials are often made from temperature-sensitive materials which cannot withstand heating to high temperatures. Furthermore, the prints applied to such items require some flexibility as they change from a generally flat to an expanded or bent configuration in use.

U.S. Pat. No. 6,663,455 describes the application of an ink retentive, markable coating to the sheet materials used to make balloons and wrappable materials. However there are very few commercially available balloons and wrappable coatings which carry such an ink retentive coating. Furthermore, application of an ink retentive coating to the whole substrate is wasteful when only part of the substrate is to be printed, resulting in increased costs for consumers. Ideally the providers of personalized balloons and wrappable materials are not limited to specialised substrates carrying special coatings and they desire the ability to print ordinary substrates which have no special ink retentive coating.

Transparent sheets used on overhead projectors can also be temperature sensitive. Printed overhead transparencies also require inks which provide prints which do not easily fall off when the transparency is bent in normal use.

There is a need for aqueous inks which can be applied to ordinary, non-absorbent substrates to provide prints having good adhesion, rub fastness and resolution, without the need for heating at high temperatures.

Lexmark's WO0144326 describes aqueous ink jet inks for printing absorbent paper. The inks comprise a conventional pigment, humectant, dispersant and a specified latex binder. The abstract mentions optionally passing the printed paper through a fuser system at a temperature greater than about 100° C. for about 5 to about 100 seconds. This fusing temperature and time can be tolerated for paper, but for many temperature-sensitive substrates the use of such conditions can damage, distort or even melt the substrate. Furthermore, absorbent paper does not suffer from the same technical problems as printing non-absorbent surfaces.

According to a first aspect of the present invention there is provided a process for printing a substrate comprising applying thereto an ink by means of an ink jet printer, wherein the ink comprises a latex binder, a liquid medium comprising water and organic solvent, and polymer-encapsulated pigment particles comprising a carboxy-functional dispersant crosslinked around a pigment core by a crosslinking agent, wherein the ink has a minimum film-forming temperature below 70° C.

The ink preferably has a minimum film-forming temperature ("MFFT") below 65° C., especially below 60° C.

The MFFT is the lowest temperature at which components of the ink components will coalesce to form a film, e.g. during ink drying.

Equipment for measuring MFFT is commercially available, for example the Minimum Film Forming Temperature Bar is available from Rhopoint Instruments (the "MFFT Bar 90"). The MFFT Bar 90 comprises a temperature bar having a nickel-plated copper platen with an electronically imposed temperature gradient. Ten equispaced sensors beneath the surface provide instantaneous temperature measurement along the bar. The desired temperature program is selected and the instrument allowed to reach thermal equilibrium. Tracks of wet test ink may be applied using a cube applicator, or spreader. Once the ink has dried the device shows the MFFT. If for any reason the abovementioned commercially available equipment does not work on the ink (e.g. due to a low latex content and/or the ink's colour), one may instead place a small amount of the ink in a dish and heat the dish containing the ink at the desired assessment temperature (e.g. 70° C.) for 24 hours and then rub the surface with a gloved finger to assess whether a film has formed. If a film has formed there will be little or no ink transfer to the gloved finger, whereas if a film has not formed there will be a significant transfer of ink to the gloved finger or the dried ink will crack.

The Tg (glass transition temperature) of the latex binder can be higher than the MFFT due to the presence of ink components such as organic solvents which lower the temperature at which the latex binder forms a film or glass. Preferably the latex binder has a Tg below 120° C. (e.g. 30 to 119° C.), especially below 110° C. (e.g. 40 to 105° C.), more especially below 99° C. (e.g. 40 to 95° C.) and particularly below 85° C. (e.g. 40 to 80° C.).

The latex binder optionally has an acid value of 0 to 30 mg KOH/g, especially 0 to 20 mg KOH/g, more especially up to 5 mg KOH/g. When the latex binder is a polyurethane or polyester its acid value is preferably >0 mg KOH/g.

Preferred latex binders are acrylic, polyurethane and polyester latex binders and they may be homopolymers or, more preferably, copolymers.

In one embodiment the latex binder is other than an acrylic latex binder. In another embodiment the latex binder is other than a polyurethane latex binder. In another embodiment the latex binder is other than a polyester latex binder.

The latex binders are typically water-dispersible particles or 'beads' which are capable of coalescing to form a film when heated above their MFFT.

Preferred acrylic latex binders are derived from the copolymerisation of one or more ethylenically unsaturated compound having a water-dispersing group (e.g. an acidic, poly(alkylene glycol), hydroxy, amino or cationic group) with one or more ethylenically unsaturated compound which is free from water-dispersing groups.

The acidic groups include, for example, sulpho, carboxy and/or phosphato groups. The preferred salts for acidic groups are lithium, ammonium, sodium and potassium salts and mixtures comprising two or more thereof. The cationic groups include quaternary ammonium groups. These groups will be often be partially or wholly in salt form. The preferred salts for cationic groups are halide and simple organic acid salts, e.g. chloride, acetate, propionate and/or lactate.

Examples of ethylenically unsaturated compounds having an acidic water-dispersing group include (meth)acrylic acid, beta carboxy ethyl (meth)acrylate, maleic acid, vinyl sulphonic acid, phosphonomethylated acrylamide, (2-carboxyethyl)acrylamide, 2-(meth)acrylamido-2-methylpropanesulfonic acid and (meth)acryloyloxyethyl succinate.

Typically the latexes are prepared in the presence of a surfactant. However when the latex is derived from ethylenically unsaturated compounds having a water-dispersing group, less surfactant may be required and in some cases no surfactant is necessary. The content of surfactant and ethylenically unsaturated compounds having a water-dispersing group, when present, is preferably sufficiently high to ensure the polymer forms an emulsion in the ink and not so high as to form a solution in the ink.

Examples of ethylenically unsaturated compounds having a poly(alkylene glycol) water-dispersing group include polyethylene glycol monomethacrylate, polypropylene glycol monoacrylate, polypropylene glycol monomethacrylate, poly(ethylene glycol)diacrylate, poly(ethylene glycol)divinyl ether, poly(ethylene glycol)diallyl ether, poly(ethylene glycol-co-propylene glycol)diacrylate, poly(ethylene glycol)-block-poly(propylene glycol)-block-poly(ethylene glycol)diacrylate, a diacrylate of a copolymer of polyethylene glycol and other building blocks e.g. polyamide, polycarbonate, polyester, polyimide, polysulfone, and combinations thereof, and compounds of the following structure, wherein w is 1 to 100 and $R^{11}$ is H or an alkyl group of $C_1$-$C_{10}$ (i.e. comprising 1 to 10 carbon atoms) or an aromatic group or an alkoxy group or an ester group, and $R^{12}$ is H or a methyl group:

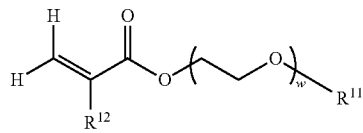

Examples of ethylenically unsaturated compounds having a cationic water-dispersing group include (3-acrylamidopropyl)trimethylammonium chloride, 3-methacrylamidopropyl trimethyl ammonium chloride, (ar-vinylbenzyl)trimethylammonium chloride, (2-(methacryloyloxy)ethyl)trimethylammonium chloride, [3-(methacryloylamino)propyl]trimethyl ammonium chloride, (2-acrylamido-2-methylpropyl)trimethylammonium chloride, 3-acrylamido-3-methylbutyl trimethyl ammonium chloride, acryloylamino-2-hydroxypropyl trimethyl ammonium chloride and N-(2-aminoethyl)acrylamide trimethyl ammonium chloride.

Examples of ethylenically unsaturated compounds having a hydroxy group include: 2-hydroxyethyl acrylate; 2-hydroxyethyl methacrylate; hydroxypropyl acrylates; and hydroxypropyl methacrylates; hydroxybutyl acrylates; hydroxybutyl methacrylates; poly(ethylene glycol) mono acrylates; poly(ethylene glycol) mono methacrylates; poly (propylene glycol) mono acrylates; and poly(propylene glycol) mono methacrylates. Especially preferred are 2-hydroxyethyl acrylate and 2-hydroxyethyl methacrylate.

The one or more ethylenically unsaturated compound which is free from water-dispersing groups is useful to lower the water solubility of the latex to ensure an emulsion is formed in the ink as opposed to a solution. Examples of ethylenically unsaturated compounds which are free from water-dispersing groups include styrenic monomers (e.g. styrene and substituted styrenes); alkyl acrylates and alkyl methacrylates (e.g. especially $C_{1-12}$-alkyl acrylates and methacrylates, such as, for example, methyl acrylate, methyl methacrylate, ethyl acrylate, ethyl methacrylate, propyl acrylate, propyl methacrylate, butyl acrylate, butyl methacrylate, 2-ethylhexyl acrylate, 2-ethylhexyl methacrylate, octyl acrylate, octyl methacrylate, dodecyl acrylate, dodecyl methacrylate etc.) and combinations comprising two or more thereof.

The one or more ethylenically unsaturated compound which is free from water-dispersing groups are preferably mono-, di- and/or poly-functional compounds (i.e. having one, two or more than two ethylenically unsaturated groups). Di- and/or poly-functional compounds may also be used to crosslink or partially crosslink the acrylic latex.

Examples of suitable difunctional compounds include Bisphenol A ethoxylate diacrylate, neopentyl glycol ethoxylate diacrylate, propanediol ethoxylate diacrylate, butanediol ethoxylate diacrylate, hexanediol ethoxylate diacrylate, ethylene glycol di(meth)acrylate, diethylene glycol di(meth)acrylate, divinylbenzene and combinations comprising two or more thereof.

Examples of suitable polyfunctional compounds include glycerol ethoxylate triacrylate, trimethylolpropane ethoxylate triacrylate, trimethylolpropane ethoxylate triacrylate, pentaerythrytol ethoxylate tetraacrylate, ditrimethylolpropane ethoxylate tetraacrylate, dipentaerythrytol ethoxylate hexaacrylate and combinations comprising two or more thereof.

The acrylic latex binders may be prepared by copolymerising the one or more ethylenically unsaturated compound having a water-dispersing group (e.g. a hydroxy group) with one or more ethylenically unsaturated compound which is free from water-dispersing groups by any suitable means, e.g. by emulsion polymerisation. The emulsion may be formed by any suitable technique, for example solution-dispersion, phase inversion and/or melt-dispersion techniques.

Preferred acrylic latex binders comprise copolymers of three or four different monomers. Preferred acrylic latex binders comprise copolymers of: (i) a styrenic monomer (especially styrene or substituted styrene), (ii) at least one alkyl (meth)acrylate (especially $C_{1-12}$-alkyl(meth)acrylate) and (iii) an ethylenically unsaturated compound having a water-dispersing group (especially carboxylic acid or hydroxy group, more especially a hydroxyl group). In the foregoing preferred resins or latexes, most preferably (i) is styrene, (ii) is at least one $C_{1-4}$alkyl(meth)acrylate and (iii) an ethylenically unsaturated compound having a carboxylic acid group or more preferably a hydroxy group. Preferred examples of (iii) include acrylic acid, methacrylic acid, beta-carboxyethyl acrylate and hydroxyl functional alkyl(meth)acrylates (especially a hydroxyl functional $C_{1-4}$alkyl(meth)acrylate, e.g. 2-hydroxyethyl methacrylate).

The molecular weight of the acrylic latex binders can be controlled by methods known in the art, for example, by use of a chain transfer agent (e.g. a mercaptan) and/or by control of initiator concentration in the case of emulsion polymerisation, and/or by heating time.

Methods for performing emulsion polymerisation are not particularly limited. In some embodiments of the present invention, the ethylenically unsaturated compounds may be added in one or more batches or fed continuously to a solution of ionic surfactant and an initiator in water. The polymerisation is then preferably carried out by heating. The polymerisation is preferably carried out under a nitrogen atmosphere. Preferably, to control the reaction, the mixture of ethylenically unsaturated compounds is fed continuously, more preferably under starve-feed conditions. Preferably, a seed polymerisation is carried out first using a minor amount of the mixture of ethylenically unsaturated compounds (e.g. up to 10%) and once this is completed, the remainder of the mixture of ethylenically unsaturated compounds is preferably fed continuously, more preferably under starve-feed conditions. All or some of the ionic surfactant may be present in the solution at the start of the polymerisation. Where some of the ionic surfactant is present to begin with the remainder of the ionic surfactant may be added (e.g. fed continuously) as the polymerisation progresses. A non-ionic surfactant may be used in addition to the ionic surfactant. The solution may contain all or some of the initiator. Preferably, at least a portion of the initiator is present in the solution to begin with. Where not all of the initiator is present to begin with, the remainder may be added in one or more batches or fed continuously (preferably fed continuously) to the solution as the polymerisation progresses. A solution of the initiator with ionic surfactant in water may be used for this purpose and preferably is fed continuously. Preferably, the initiator is fed continuously.

Suitable ionic surfactants include known anionic and cationic surfactants. Examples of suitable anionic surfactants are: alkyl benzene sulphonates (e.g. sodium dodecylbenzene sulphonate); alkyl sulphates; alkyl ether sulphates; sulphosuccinates; phosphate esters; fatty acid carboxylates, including alkyl carboxylates; and alkyl or aryl alkoxylated carboxylates, which include, for example, alkyl ethoxylated carboxylates, alkyl propoxylated carboxylates and alkyl ethoxylated/propoxylated carboxylates.

Examples of suitable cationic surfactants are: quaternary ammonium salts; benzalkonium chloride; ethoxylated amines.

Examples of non-ionic surfactants are: alkyl ethoxylates; alkyl propoxylates; alkyl aryl ethoxylates; alkyl aryl propoxylates; and ethylene oxide/propylene oxide copolymers. In a preferred embodiment, the ionic surfactant comprises an anionic surfactant, especially an anionic surfactant having a sulphonate, sulphate, phosphate and/or carboxylate group (e.g. a sulpho or carboxy functional anionic surfactant). Anionic surfactants having a sulphonate group are the preferred type of surfactant. Examples of ionic surfactant comprising a carboxylate group include fatty acid carboxylates, e.g. salts of lauric acid, myristic acid, palmitic acid, stearic acid, oleic acid and the like. Most preferred still are the alkyl alkoxylated carboxylates, such as, for example, alkyl ethoxylated carboxylates, alkyl propoxylated carboxylates and alkyl ethoxylated/propoxylated carboxylates, especially wherein the alkyl is $C_{8-14}$-alkyl. Suitable alkyl alkoxylated carboxylates are commercially available, such as in the Akypo™ range of surfactants from Kao Corporation and the Marlowet™ range of surfactants from Sasol. Examples of ionic surfactants comprising a sulphonate group include, sodium dioctyl sulphosuccinate, sodium di-sec-butyl naphthalene sulphonate, disodium dodecyl diphenyl ether sulphonate, disodium n-octadecyl sulphosuccinate and especially sodium dodecyl benzene sulphonate. Examples of ionic surfactants comprising a sulphonate group and a carboxylate group include disodium laureth-3 sulfosuccinate. Examples of ionic surfactants comprising a phosphate group include alkyl phosphate mono or di-esters such as ethoxylated dodecyl alcohol phosphate ester. The aforementioned ionic surfactants are usually in salt form, e.g. the form of a sodium, potassium, lithium or ammonium salt or a mixed salt comprising two or more of the foregoing.

The latex binders preferably have an average particle size of below 1000 nm, more preferably below 200 nm and especially below 150 nm. Preferably, the average particle size of the latex binder is at least 20 nm, more preferably at least 50 nm. Thus, the latex binder may preferably have an average particle size of 20 to 200 nm, more preferably 50 to 150 nm. The average particle size of the latex binders may be measured using photon correlation spectroscopy.

Suitable initiators for emulsion polymerisation include persulphates, e.g. sodium persulphate, potassium persulphate or ammonium persulphate. Other suitable initiators are known in the art, e.g. azo and peroxide initiators. As the initiator, combinations of initiators may be used or they be used singly.

Chain transfer agents (CTAs) for emulsion polymerisation may be contained in the monomer mixture or added separately to the solution. Suitable CTAs include mercaptans (thiols), such as alkyl mercaptans and thioglycolates, and halocarbons. Examples of alkyl mercaptans include dodecyl mercaptan. Examples of thioglycolates include iso-octyl thioglycolate. Examples of halocarbons include carbon tetrachloride and carbon tetrabromide.

The latex binder once formed is preferably screened to remove oversized particles prior to use, for example through a filter having an average pore size below 3 µm, preferably 0.3 to 2 µm, especially 0.5 to 1.5 µm. The latex binder may be screened before, during or after it is mixed with other components to form the ink.

The polyurethane latex is typically derived from the polymerisation of a mixture comprising a polyol component and an isocyanate component.

The preferred isocyanate component is of Formula (I):

$$O=C=N-R-N=C=O \qquad \text{Formula (I)}$$

wherein R is an alkylene group, a cycloalkylene group (preferably a 5- to 7 membered cycloalkylene group), an arylene group, (preferably a phenylene group or a naphthylene group) an alkylene-bisarylene group or an arylene-bisalkylene group.

Suitable polyols include polyalkylene ether glycols, alkyd resins, polyesters, polyesteramides, hydrocarbons and polycarbonates having two or more hydroxy groups.

The polyurethane latex is preferably produced by emulsifying a polyisocyanate prepolymer and then chain extending the said prepolymer using a chain-extending agent, e.g., water.

A particularly preferred polyurethane latex is derived from a prepolymer containing a caprolactone.

The polyurethane latex may be produced by chain extending a diisocyanate prepolymer with a polyol.

Polyurethane latexes having acidic or cationic groups may be formed by using a monomer, oligomer and/or prepolymer having the desired group.

Suitable polyols which can be used to provide the desired groups in the end polyurethane latex include polyesters, 2,2-bis(hydroxymethyl)propionic acid and N,N bis(2-hydroxyethyl)glycine.

Particularly advantageous polyurethane latex may be derived from a polycaprolactone whose both ends are protected with a glycol.

As examples of polyols there may be mentioned:
(1) diols: e.g., alkylene diols having from 2 to 10 carbon atoms, polyalkylene glycols of formula: HO(RO)$_n$H and polyesters of formula HO(CO.RO)$_n$H, wherein R is an alkylene group (e.g. a C$_{2-10}$ alkylene chain) and n is from 2 to 15;
(2) triols: e.g., glycerol, 2-ethyl-2-hydroxy-methyl-1,3-propanediol, 1,11-3) tetraols: e.g., pentaerythritol, higher polyols e.g., sorbitol.

As the chain length of R increases the Tg of the resultant polyurethane and the MFFT of the resultant ink will generally decrease.

Other preferred polyols include a linear polyesters, and a block copolymers with ethyleneoxide and propyleneoxide and diamines e.g., ethylenediamine, which have hydroxy groups at the ends thereof.

Preferred diisocyanates include 2,4- and 2,6-toluene diisocyanate, diphenyl methane-4,4'-diisocyanate, polymethylene-diphenylene isocyanate, bitoluene diisocyanate, dianisidine diisocyanate, 1,5-naphthalene diisocyanate, 1,6-hexamethylene diisocyanate, bis(isocyanate cyclohexyl) methane diisocyanate, isophorone diisocyanate, 2,2,4-trimethyl hexane diisocyanate and xylene diisocyanate.

A polyurethane prepolymer may be prepared by mixing the polyol and isocyanate with stirring under nitrogen, typically at a temperature of 25 to 110° C. The reaction may be advantageously carried out in the presence of a solvent, if desired, together with a catalyst. Useful solvents for the reaction include ketones and esters, aliphatic hydrocarbons (e.g. heptane or octane) and alicyclic hydrocarbons (e.g. methyl cyclohexane). Useful catalysts include tertiary amines, acids and organic metallic compounds (e.g. triethylamine, stannous chloride or di-n-butyl-tin dilaurate). If both polyol and isocyanate are liquid and the prepolymer is also liquid, the use of the organic solvent is not usually necessary.

After producing a prepolymer, the prepolymer may be emulsified and then chain extended in the presence of a chain extending agent (e.g. water) to thereby prepare the latex.

The emulsification of the prepolymer may be performed in the presence of a surfactant. Where the prepolymer contains an acidic or cationic group, the addition of surfactant may be unnecessary.

Useful chain extending agents contain at least two functional groups having an active hydrogen atom, typical examples of which include a hydrazine, primary and secondary amines, aminoalcohols, amino acids, oxyacids, diols, and mixtures comprising two or more thereof. Preferred chain extending agents include water, primary diamines and secondary diamines.

Examples of suitable diamines include 1,4-cyclohexene-bis(methylamine), ethylenediamine and diethylenetriamine.

The number of moles of chain-extending agent used is typically equal to or about equal to the number of moles of isocyanate prepolymer.

The polyester latex may be prepared using the general polymerisation procedures known for polyester synthesis. Thus, it is well known that polyesters contain carbonyloxy (i.e. —C(=O)—O—) linking groups and may be prepared by a condensation polymerisation process in which an acid component (including ester-forming derivatives thereof) is reacted with a hydroxyl component. The acid component may be selected from one or more polybasic carboxylic acids, e.g. di- and tri-carboxylic acids or ester-forming derivatives thereof, for example acid halides, anhydrides or esters. The hydroxyl component may be one or more polyhydric alcohols or phenols (polyols), for example, diols, triols, etc. (It is to be understood, however, that the polyester may contain, if desired, a proportion of carbonylamino linking groups —C(=O)—NH— (i.e. amide linking groups) by, for example, including an appropriate amino functional reactant as part of the "hydroxyl component"; such as amide linkages). The reaction to form a polyester may be conducted in one or more stages. It is also possible to introduce in-chain unsaturation into the polyester by, for example, employing as part of the acid component an olefinically unsaturated dicarboxylic acid or anhydride.

Preferred polybasic carboxylic acids which can be used to form the polyester have two or three carboxylic acid groups. For example, one can use C4 to C20 aliphatic, alicyclic and aromatic compounds having two or more carboxy groups and their ester forming derivatives (e.g. esters, anhydrides and acid chlorides), and dimer acids such as C36 dimer acids. Specific examples include adipic acid, fumaric acid, maleic acid, succinic acid, itaconic acid, sebacic acid, nonanedioic acid, decanedioic acid, 1,4-cyclohexanedicarboxylic acid, 1,3-cyclohexanedicarboxylic acid, 1,2-cyclohexanedicarboxylic acid, terephthalic acid, isophthalic acid, phthalic acid and tetrahydrophthalic acid and their acid chlorides. Anhydrides include succinic, maleic, phthalic and hexahydrophthalic anhydrides.

Preferred polyols which can be used to form the polyester include those having from 2 to 6, more preferably 2 to 4 and especially 2 hydroxyl groups per molecule. Suitable polyols having two hydroxy groups per molecule include diols such as 1,2-ethanediol, 1,3-propanediol, 1,4-butanediol, 1,6-hexanediol, 2,2-dimethyl-1,3-propanediol (neopentyl glycol), the 1,2-, 1,3- and 1,4-cyclohexanediols and the corresponding cyclohexane dimethanols, diethylene glycol, dipropylene glycol, and diols such as alkoxylated bisphenol A products, e.g. ethoxylated or propoxylated bisphenol A. Suitable polyols having three hydroxy groups per molecule include triols such as trimethylolpropane (1,1,1-tris(hydroxymethyl) ethane). Suitable polyols having four or more hydroxy groups per molecule include pentaerythritol (2,2-bis(hydroxymethyl)-1,3-propanediol) and sorbitol (1,2,3,4,5,6-hexahydroxyhexane).

The polyester latex may be prepared by, for example, solution-dispersion, phase-inversion or melt emulsification processes. The polyester latex may be stabilised in the aqueous medium either by a surfactant, or by salts of carboxylic acid groups present in the polymer or by a combination of both.

Preferably, the polyester resin is dispersed in an aqueous medium by: mixing at least a polyester resin, an organic solvent, water, optionally an ionic surfactant and optionally a base; and removing the organic solvent from the resultant mixture to form an aqueous dispersion of polyester resin particles. More preferably, the polyester resin is dispersed in the aqueous medium by providing (e.g. dissolving) the polyester resin in an organic solvent to form an organic phase; preparing an aqueous phase comprising water, optionally an ionic surfactant and optionally a base; mixing the organic phase and the aqueous phase to disperse droplets of the organic phase in the aqueous phase; and removing the organic solvent to leave an aqueous dispersion of polyester resin particles. Mixing, e.g. of the organic phase and the aqueous phase, may be performed by any suitable method of mixing dispersions. The mixing may be performed using a low shear energy step (e.g. using a low shear stirring means) and/or a high shear energy step (e.g. using a rotor-stator type mixer).

The organic solvent may be water-immiscible or water-miscible. Any suitable known water-immiscible organic solvent may be used for dissolving the polyester resin. Suitable water-immiscible organic solvents include: alkyl acetates (e.g. ethyl acetate), hydrocarbons (e.g. hexane, heptane, cyclohexane, toluene, xylene etc.), halogenated hydrocarbons (e.g. methylene chloride, monochlorobenzene, dichlorobenzene etc.) and other known water-immiscible organic solvents. Preferred solvents are methylene chloride (i.e. dichloromethane) and ethyl acetate and mixtures thereof. Two or more solvents (i.e. co-solvents) may be used.

Suitable examples of water-miscible solvents include alcohols (e.g. methanol, ethanol, propanol, isopropanol (IPA), butanol etc.), ketones (e.g. acetone, methyl ethyl ketone (MEK) etc.), glycols (e.g. ethylene glycol, propylene glycol etc.), alkyl ethers of ethylene glycol (e.g. methyl Cellosolve™, ethyl Cellosolve™, butyl Cellosolve™ etc.), alkyl ethers of diethylene glycol (e.g. ethyl Carbitol™, butyl Carbitol™ etc.), alkyl ethers of propylene glycol, ethers (dioxane, tetrahydrofuran etc.) and the like.

The optional base may be any suitable base for neutralizing acid groups, for example, metal salts (such as sodium hydroxide, potassium hydroxide), ammonium hydroxide and the like and amines (e.g. organic amines).

The desired MFFT may be achieved by selecting appropriate combinations of polymer latex and organic solvents. If the MFFT of an ink is too high, the amount of coalescing solvent may be increased and/or a polymer latex of lower Tg may be used in order to bring the ink MFFT into the desired range. Therefore at the ink design stage one may decide whether to include more or less coalescing solvent and higher or lower Tg polymer latex, depending on the desired MFFT.

Preferably the polymer-encapsulated pigment particles comprise a carboxy-functional dispersant crosslinked around a pigment core by a crosslinking agent having at least two groups selected from oxetane, carbodiimide, hydrazide, oxazoline, aziridine, isocyanate, N-methylol, keteneimine, isocyanurate and epoxy groups, especially two or more epoxy groups.

The dispersant, prior to crosslinking with the crosslinking agent, preferably has an acid value of at least 125 mg KOH/g.

The dispersant preferably has one or more oligomeric dispersing groups.

In order to provide water-dispersibility, the polymer-encapsulated pigment particles preferably have carboxy groups (i.e. not all of the carboxy groups in the dispersant are crosslinked to form the polymer-encapsulated pigment particles).

The polymer-encapsulated pigment particles may be prepared by crosslinking some of the carboxy groups in a carboxy-functional dispersant in the presence of a pigment and a crosslinking agent, preferably at a temperature of less than 100° C. and/or a pH of at least 6. Such crosslinking is usually performed in an aqueous medium, for example in a mixture comprising water and organic solvent. Suitable mixtures comprising water and organic solvent are as described above in relation to the ink.

Preferably, the polymer-encapsulated pigment particles have a Z-average particle size of less than 500 nm, more preferably from 10 to 400 nm and especially from 15 to 300 nm.

The Z-average particle size may be measured by any means, but a preferred method is by photo correlation spectroscopy devices available from Malvern™ or Coulter™.

The pigment present in the polymer-encapsulated pigment particles may be any coloured inorganic or organic particulates which can provide colour to an ink.

The pigment may be any insoluble, coloured, particulate, for example an organic or an inorganic pigment.

Preferred pigments are carbon black and organic pigments, for example any of the classes of pigments described in the Third Edition of the Colour Index (1971) and subsequent revisions of, and supplements thereto, under the chapter headed "Pigments". Examples of organic pigments are those from the azo (including disazo and condensed azo), thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivatives, and also lakes of acid, basic and mordant dyes. Carbon black, although often regarded as being inorganic, behaves more like an organic pigment in its dispersing properties and is suitable. Preferred organic pigments are phthalocyanines, especially copper phthalocyanine pigments, azo pigments, indanthrones, anthanthrones, quinacridones and carbon black pigments.

The pigment is preferably a cyan, magenta, yellow or black pigment. The pigment may be a single chemical species or a mixture comprising two or more chemical species (e.g. a mixture comprising two or more different pigments). In other words, two or more different pigments solids may be used in the process of the present invention.

Suitable methods for making the polymer-encapsulated pigment particles are described in WO 2006/064193 and WO2010038071. In essence, a dispersant having carboxy groups is adsorbed onto a pigment and then some (but not all) of the carboxy groups are crosslinked to give a pigment dispersion where the pigment is permanently trapped within the crosslinked dispersant. Such particles may be obtained commercially from FUJIFILM Imaging Colorants Limited or its sister company in the USA.

Preferably the carboxy-functional dispersants comprise benzyl methacrylate.

A preferred carboxy-functional dispersant is a copolymer comprising one or more hydrophobic ethylenically unsaturated monomers (preferably at least half of which by weight is benzyl methacrylate), one or more hydrophilic ethylenically unsaturated monomers having one or more carboxy groups; and optionally some or no hydrophilic ethylenically unsaturated monomers having one or more hydrophilic non-ionic groups.

An especially preferred carboxy-functional dispersant is a copolymer comprising:
(a) from 75 to 97 parts of one or more hydrophobic ethylenically unsaturated monomers comprising at least 50 parts of benzyl methacrylate;
(b) from 3 to 25 parts of one or more hydrophilic ethylenically unsaturated monomers having one or more carboxy groups; and
(c) 0 to 1 part of hydrophilic ethylenically unsaturated monomers having one or more hydrophilic non-ionic groups;
wherein the parts are by weight.

Typically and the sum of the parts a) to c) add up to 100.

It is preferred that the only hydrophobic ethylenically unsaturated monomer in component a) is benzyl methacylate.

More preferably the carboxy-functional dispersant is a copolymer comprising:
(a) from 80 to 93 parts of one or more hydrophobic ethylenically unsaturated monomers comprising at least 50 parts benzyl methacrylate;
(b) from 7 to 20 parts of one or more hydrophilic ethylenically unsaturated monomers having one or more carboxy groups;
(c) 0 to 1 part of hydrophilic ethylenically unsaturated monomers having a hydrophilic non-ionic group;
wherein the parts are by weight.

Typically and the sum of the parts a) to c) add up to 100.

Preferably the hydrophobic monomers have no hydrophilic groups, whether ionic or non-ionic. For example, they are preferably free from water-dispersing groups.

Preferably, the hydrophobic ethylenically unsaturated monomers have a calculated Log P value of at least 1, more preferably from 1 to 6, especially from 2 to 6.

A review by Mannhold, R. and Dross, K. (Quant. Struct-Act. Relat. 15, 403-409, 1996) describes how to calculate Log P values.

Preferred hydrophobic ethylenically unsaturated monomers are styrenic monomers (e.g. styrene and alpha methyl styrene), aromatic (meth)acrylates (especially benzyl (meth) acrylate), $C_{1-30}$-hydrocarbyl(meth)acrylates, butadiene, (meth)acrylates containing poly($C_{3-4}$)alkylene oxide groups, (meth)acrylates containing alkylsiloxane or fluorinated alkyl groups and vinyl naphthalene.

Preferably, the dispersant comprises the repeat units from copolymerising from 75 to 97, more preferably from 77 to 97, especially from 80 to 93 and most especially from 82 to 91 parts by weight of component a).

Dispersants comprising at least 50 parts of benzyl (meth) acrylate monomer repeat units can provide polymer-encapsulated pigment dispersions with good stability and good optical density.

Component a) preferably comprises at least 60 parts, more preferably at least 70 and especially at least 80 parts by weight of benzyl (meth)acylate. The remainder required to obtain the overall preferred amounts of hydrophobic monomers may be provided by any one or more of the above hydrophobic monomers other than benzyl (meth)acrylate. Preferably, benzyl (meth)acrylate is benzyl methacrylate (rather than benzyl acrylate).

In a preferred embodiment component a) comprises only benzyl (meth)acrylate, more preferably only benzyl methacrylate.

Preferably, the monomers in component b) have a calculated Log P value of less than 1, more preferably from 0.99 to −2, especially from 0.99 to 0 and most especially from 0.99 to 0.5, when calculated in the un-neutralised (e.g. free acid) form.

Preferred hydrophilic ethylenically unsaturated monomers for component b) having one or more carboxylic acid groups include beta carboxylethyl acrylate, itaconic acid, maleic acid, fumaric acid, crotonic acid, more preferably acrylic acid and especially methacrylic acid. Preferably, these ethylenically unsaturated monomers when polymerised provide the only ionic groups in the dispersant.

In a preferred embodiment component b) is or comprises methacrylic acid.

Preferably, the dispersant comprises the repeat units from copolymerising 3 to 25, more preferably 3 to 23, especially 7 to 20 and most especially 9 to 18 parts by weight of component b). This is especially so when component b) comprises, or more preferably is, methacrylic acid.

For the purposes of the present invention a monomer having both ionic and non-ionic hydrophilic groups is considered to belong to component c). Thus, all the ethylenically unsaturated monomers in component b) are free from hydrophilic non-ionic groups.

Preferably, the monomers in component c) have calculated Log P values of less than 1, more preferably from 0.99 to −2.

Preferably, component c) is less than 1 part, more preferably less than 0.5 parts, especially less than 0.1 parts and most especially 0 parts (i.e. absent). In this way the dispersant contains no repeat units from hydrophilic monomers having one or more hydrophilic non-ionic groups.

Examples of hydrophilic non-ionic groups include polyethyleneoxy, polyacrylamide, polyvinyl pyrrolidone, hydroxy functional celluloses and poly vinyl alcohol. The most common ethylenically unsaturated monomer having a hydrophilic non-ionic group is polyethyleneoxy(meth)acrylate.

In embodiments where repeat units from component c) are present in the dispersant (for example 1 part by weight of component c)) then in one embodiment the amount of component c) is deducted from the preferred amounts of component a). In this way the amounts of all the components a) to c) still adds up to 100. Thus for embodiments where 1 part by weight of component c) is present the preferred amounts of component a) expressed above would become from 74 to 96 (75-1 to 97-1), more preferably from 76 to 96 (77-1 to 97-1), especially from 79 to 92 (80-1 to 93-1) and most especially from 81 to 90 (82-1 to 91-1) parts by weight of component a). In an another embodiment it is possible to deduct the amount of component c) from the preferred amounts of component b) so that again the sum of the amounts of components a) to c) adds to 100 parts by weight.

The function of the carboxylic acid group(s) in the dispersant is primarily to cross-link with the crosslinking agent and to provide the subsequent polymer-encapsulated pigment particles with the ability to disperse in aqueous ink media. Where carboxylic acid group(s) are the only groups for stabilising the polymer-encapsulated pigment particles in the aqueous medium it is preferable to have a molar excess of carboxylic acid groups to carboxy-reactive groups (e.g. epoxy groups) in the crosslinking agent to ensure that unreacted carboxylic acid groups remain after the crosslinking reaction has been completed. In one embodiment the ratio of moles of carboxylic acid groups to moles of carboxy-reactive groups (e.g. epoxy groups) in the crosslinking agent is preferably from 10:1 to 1.1:1, more preferably from 5:1 to 1.1:1 and especially preferably from 3:1 to 1.1:1

The dispersant may optionally have other stabilising groups. The choice of the stabilising groups as well as the amounts of such groups will depend to a large extent on the nature of the aqueous medium.

In embodiments where the crosslinking agent has one or more oligomeric dispersing group the dispersant preferably has an acid value of at least 125 mg KOH/g.

The acid value (AV) of the dispersant, prior to crosslinking with the crosslinking agent, is preferably from 130 to 320 and more preferably from 135 to 250 mg KOH/g. We have found that dispersants having such acid values provide resultant polymer-encapsulated pigment particles which exhibit good stability in aqueous inks and also have sufficient carboxy groups for subsequent crosslinking with the crosslinking agent. Preferably, the dispersant (prior to crosslinking) has a number average molecular weight of from 500 to 100,000, more preferably from 1,000 to 50,000 and especially from 1,000 to 35,000. The molecular weight may be measured by gel permeation chromatography ("GPC").

The dispersant need not be totally soluble in the liquid medium used to make the polymer-encapsulated pigment particles. That is to say perfectly clear and non-scattering solutions are not essential. The dispersant may aggregate in surfactant-like micelles giving slightly hazy solutions in the liquid medium. The dispersant may be such that some proportion of the dispersant tends to form a colloid or micellar phase. It is preferred that the dispersant produces uniform and stable dispersions in the liquid medium used to make the polymer-encapsulated pigment particles which do not settle or separate on standing.

It is preferred that the dispersant is substantially soluble in the liquid medium used to make the polymer-encapsulated pigment particles, giving rise to clear or hazy solutions.

Preferred random polymeric dispersants tend to give clear compositions whilst less preferred polymeric dispersants with two or more segments tend to give rise to the aforementioned hazy compositions in liquid media.

Typically the dispersant adsorbs onto the pigment prior to crosslinking so as to form a relatively stable dispersion of the pigment particles. This dispersion is then crosslinked using the crosslinking agent to form the polymer-encapsulated pigment particles. This pre-adsorption and pre-stabilisation in particular distinguishes the present invention from coacervation approaches whereby a polymer or prepolymer (which is not a dispersant) is mixed with a particulate solid, a liquid medium and the crosslinking agent and only during or after crosslinking does the resultant cross-linked polymer precipitate onto the particulate solid.

In embodiments where the dispersant has an acid value of at least 125 mg KOH/g the crosslinking agent may have no oligomeric dispersing groups, but preferably the crosslinking agent has one or more oligomeric dispersing groups.

Crosslinking agents having one or more oligomeric dispersing group increase the stability of the polymer-encapsulated pigment particles in the ink.

The oligomeric dispersing group preferably is or comprises polyalkyleneoxide, more preferably a poly$C_{2-4}$-alkyleneoxide and especially a polyethyleneoxide. The polyalkyleneoxide groups provide steric stabilisation which improves the stability of the resulting encapsulated particulate solid.

Preferably the polyalkyeneoxide contains from 3 to 200, more preferably from 5 to 50 alkyleneoxide and especially from 5 to 20 alkyleneoxide repeat units.

The crosslinking agent preferably has at least two epoxy groups.

Preferred crosslinking agents having two epoxy groups and zero oligomeric dispersing groups are ethylene glycol diglycidyl ether, resorcinol diglycidyl ether, neopentyl glycol diglycidyl ether, 1,6-hexanediol diglycidyl ether, hydrogenated bisphenol A diglycidyl ether and polybutadiene diglycidyl ether.

Preferred crosslinking agents having two epoxy groups and one or more oligomeric dispersing groups are diethylene glycol diglycidyl ether, poly ethylene glycol diglycidyl ether, dipropylene glycol diglycidyl ether and poly propylene glycol diglycidyl ether.

Preferred crosslinking agents having three or more epoxy groups and zero oligomeric dispersing groups are sorbitol polyglycidyl ether, polyglycerol polyglycidyl ether, pentaerythritol polyglycidyl ether, diglycerol polyglycidyl ether, glycerol poly glycidyl ether and trimethylolpropane polygycidyl ether.

In one embodiment the epoxy crosslinking agent has zero oligomeric dispersing groups.

Examples of oxetane crosslinking agents include 1,4-bis[(3-ethyl-3-oxetanylmethoxymethyl)]benzene, 4,4'-bis[(3-ethyl-3-oxetanyl)methoxy]benzene, 1,4-bis[(3-ethyl-3-oxetanyl)methoxy]-benzene, 1,2-bis[(3-ethyl-3-oxetanyl)-methoxy]benzene, 4,4'-bis[(3-ethyl-3-oxetanyl)methoxy]biphenyl and 3,3',5,5'-tetramethyl-[4,4'-bis(3-ethyl-3-oxetanyl)methoxy]biphenyl.

Examples of carbodiimide crosslinking agents include crosslinker CX-300 from DSM NeoResins. Carbodiimide crosslinking agents having good solubility or dispersibility in water may also be prepared as described in U.S. Pat. No. 6,124,398, synthetic Examples 1 to 93.

Examples of isocyanate crosslinking agents include isophorone diisocyanate, hexamethylene diisocyanate, toluene diisocyanate, methylene diphenyl diisocyanate, methylene dicyclohexyl diisocyante, 2-methyl-1,5-pentane diisocyanate, 2,2,4-trimethyl-1,6-hexane diisocyante and 1,12-dodecane diisocyanate, 1,11-diisocyanatoundecane, 1,12-diisocyanatododecane, 2,2,4- and 2,4,4-trimethyl-1,6-diisocyanatohexane, 1,3-diisocyanatocyclobutane, 4,4'-bis-(isocyanatocyclohexyl)-methane, hexamethylene diisocyanate, 1,2-bis-(isocyanatomethyl)-cyclobutane, 1,3- and 1,4-bis-(isocyanatomethyl)cyclohexane, hexahydro-2,4- and/or -2,6-diisocyanatoluene, 1-isocyanato-2-isocyanatomethyl cyclopentane, 1-isocyanato-3-isocyanatomethyl-3,5,5-trimethyl-cyclohexane, 2,4'-dicyclohexylmethane diisocyanate, and 1-isocyanato-4(3)-isocyanatomethyl-1-methyl cyclohexane, tetramethyl-1,3- and/or -1,4-xylylene diisocyanate, 1,3- and/or 1,4-phenylene diisocyanate, 2,4- and/or 2,6-toluene diisocyanate, 2,4- and/or 4,4'-diphenyl-methane diisocyanate, 1,5-diisocyanatonaphthalene, and p-xylylene diisocyanate. Suitable diisocyanates are also understood to include those containing modification groups such as biuret, uretdione, isocyanurate, allophanate and/or carbodiimide groups, as long as they contain two or more isocyanate groups. For isocyanates the liquid medium is preferably non-aqueous, although water can sometimes be tolerated with blocked isocyanates.

In a preferred embodiment, the polyisocyanate crosslinking agent contains three isocyanate groups. A convenient source of triisocyanate functional compounds is the known isocyanurate derivative of diisocyanates. Isocyanurate derivatives of diisocyanates can be made by reacting the diisocyanate together with a suitable trimerization catalyst. An isocyanurate derivative is produced that contains an isocyanurate core with pendant organic chains terminated by three isocyanate groups. Several isocyanurate derivatives of diisocyanates are commercially available. In one preferred embodiment, the isocyanurate used is the isocyanurate of isophorone diisocyanate. In another preferred embodiment, the isocyanaurate of hexamethylene diisocyanate is used.

Examples of N-methyol crosslinking agents include dimethoxydihydroxy ethylene urea; N,N-dimethylol ethyl carbamate; tetramethylol acetylene diurea; dimethylol urone; dimethylol ethylene urea; dimethylol propylene urea; dimethylol adipic amide; and mixtures comprising two or more thereof.

Examples of keteneimine crosslinking agents include compounds of formula $Ph_2C=C=N-C_6H_4-N=C=CPh_2$ wherein each Ph independently is an optionally substituted phenyl group.

Examples of hydrazide crosslinking agents include malonic dihydrazide, ethylmalonic dihydrazide, succinic dihydrazide, glutaric dihydrazide, adipic dihydrazide, isophthalic dihydrazide, oxalyl dihydrazide and pimelic dihydrazide.

Commercially available highly reactive oxazoline crosslinking agents are available from, for example, Nippon Shokubai under the Epocross™ trade mark. These include the emulsion type (e.g. the Epocross™ K-2000 Series, such as K-2010E, K-2020E and K-2030E) and the water-soluble types (e.g. the Epocross™ WS Series, such as WS-300, WS-500 and WS-700).

Examples of aziridine crosslinking agents include ethylene imine-based polyaziridines (e.g. PZ-28 and PZ-33 available from PolyAziridine LLC, Medford, N.J.); XC-103 tri-functional aziridines, XC-105 polyfunctional aziridines and Crosslinker XC-113 (available from SHANGHAI ZEAL-CHEM CO., LTD., China); polyfunctional aziridine liquid crosslinker SaC-100 (available from Shanghai UN Chemical Co., Ltd, China); The aziridines crosslinking agents disclosed in WO 2009/120420; NeoCryl™ CX-100 (available from DSM NeoResins); Xama™ polyfunctional aziridines (available from Lubrizol); trimethylolpropane tris(beta-aziridino) propionate, neopentylglycol di(beta-aziridino)propionate, glyceryl tris(beta-aziridino)propionate, pentaerythrityltetra (beta-aziridino)propionate, 4,4'-isopropylidenediphenol di(beta-aziridino)propionate, 4,4'-methylenediphenol di(beta-aziridino); and mixtures comprising two or more thereof.

Particularly preferred crosslinking agents are polyethylene glycol diglycidyl ether (e.g. having an average molecular weight 526, obtainable from Aldrich) and/or trimethylolpropane polyglycidyl ether (e.g. Denacol™ EX-321, obtainable from Nagase ChemteX, with weight per epoxy=140).

Preferably the organic solvent present in the ink comprises a water-miscible organic solvent. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to carbon atoms, especially 2-methoxyethanol, 2-(2-methoxyethoxy)ethanol, 2-(2-ethoxyethoxy)-ethanol, 2-[2-(2-methoxyethoxy) ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulfoxides, preferably dimethyl sulfoxide; and sulfones, preferably sulfolane. Preferably the liquid medium comprises water and 2 or more, especially from 2 to 8, water-miscible organic solvents.

Especially preferred water-miscible organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$-alkyl and $C_{1-4}$-alkyl ethers of diols, more preferably mono-$C_{1-4}$-alkyl ethers of diols having 2 to 12 carbon atoms.

Referring to the liquid medium, the weight ratio of water to organic solvent is preferably from 99:1 to 1:99, more preferably from 99:1 to 50:50 and especially from 95:5 to 70:30. Liquid media comprising larger amounts of organic solvent (e.g. above 40%) are useful where fast drying times are required, particularly when printing onto hydrophobic and non-absorbent substrates, for example plastics, metal and glass, although these have higher VOC contents and are less desirable from an environmental point of view.

The presence of a coalescing solvent (a solvent which lowers the MFFT of the ink compared to when that solvent is absent) in the ink can be useful to influence the ink's MFFT. Therefore the organic solvent preferably comprises at least one coalescing solvent. Examples of coalescing solvents include ethylene glycol monopropyl ether, propylene glycol monopropyl ether, propylene glycol monobutyl ether, ethylene glycol monobutyl ether, dipropylene glycol monomethyl ether, diethylene glycol monoethyl ether, diethylene glycol monopropyl ether, dipropylene glycol monopropyl ether, diethylene glycol monobutyl ether and diethylene glycol monoethyl ether.

Other potential coalescing solvents include 1-(2-butoxy-1-methylethoxy)propan-2-ol, dipropylene glycol monobutyl ether, 1,3-butylene glycol methyl ether, propylene glycol methyl ether, ethylene glycol diethyl ether, diethylene glycol dibutyl ether, diethylene glycol diethyl ether, diethylene glycol dimethyl ether, dipropylene glycol monomethyl ether, triethylene glycol monoethyl ether, ethylene glycol dibutyl ether, ethylene glycol mono ethyl ether, ethylene glycol mono methyl ether, ethylene glycol mono isopropyl ether, ethylene glycol monobenzyl ether, ethylene glycol monophenyl ether, terpinyl ethylene glycol ether, triethylene glycol diethyl ether, triethylene glycol dimethyl ether, triethylene glycol monobutyl ether and triethylene glycol monomethyl ether.

In one embodiment, the ink has a viscosity of less than 45 mPa·s, more preferably less than 40 mPa·s and especially less than 37 mPa·s, at a temperature of 25° C.

The ink preferably has a viscosity of less than 25 mPa·s, more preferably less than 20 mPa·s, at a temperature of 25° C.

The ink preferably has a surface tension from 20 to 65 dynes/cm, more preferably from 20 to 50 dynes/cm, especially 20 to 40 dynes/cm, when measured at 25° C.

The ink may also comprise additional components suitable for use in ink jet printing inks, for example a viscosity modifier, pH buffer (e.g. 1:9 citric acid/sodium citrate) corrosion inhibitor, biocide, dye and/or kogation reducing additive.

In a preferred embodiment the ink comprises:
(i) 0.1 to 10 parts of polymer-encapsulated pigment particles comprising a carboxy-functional dispersant crosslinked around a pigment core by a crosslinking agent;
(ii) 1 to 20 parts of latex binder;
(iii) 5 to 60 parts of organic solvent; and
(iv) 20 to 80 parts of water;
wherein all parts are by weight and the ink has an MFFT below 70° C.

Preferably the weight ratio of (ii):(i) is 0.5:1 to 5:1, more preferably 1:1 to 4:1.

The number of parts of (i) and (ii) are on a 100% solids basis, i.e. the weight of any solvents present with the polymer-encapsulated pigment particles or latex binder are not included.

The number of parts of component (i) are preferably 0.5 to 6. The number of parts of component (ii) are preferably 2 to 10.

Preferably the number of parts of (i)+(ii)+(iii)+(iv)=100. Further components may also be present in addition to components (i) to (iv), but the above amounts serve to define the preferred ranges of components (i) to (iv) relative to the total amount of components (i) to (iv).

A second aspect of the present invention provides an ink as described above in relation to the first aspect of the present invention.

The ink jet printer preferably applies the ink to the substrate in the form of droplets that are ejected through nozzles onto the substrate without the nozzles coming into contact with the substrate.

Preferred ink jet printers are piezoelectric ink jet printers and thermal ink jet printers. In thermal ink jet printers, programmed pulses of heat are used to vaporise an ink, thereby causing the ink to be ejected from an orifice in the form of small droplets. In piezoelectric ink jet printers the oscillation of a small crystal causes ejection of the ink from the orifice. Alternately the ink can be ejected by an electromechanical actuator connected to a moveable paddle or plunger, for example as described in International Patent Application WO00/48938 and International Patent Application WO00/55089. Continuous ink jet printers can also be used.

The process is particularly useful for printing temperature-sensitive substrates, e.g. substrates which deform, distort or melt at a temperature below 70° C. For example, the process can be used to print polyethylene terephthalate having a Tg of 70° C., atactic polypropylene having a Tg of −20° C. and isotactic polypropylene having a Tg of 0° C. Certain polyester, polycarbonate, vinyl polyethylene, styrene-based and PVC films also have low Tgs and can benefit from the present invention.

Typically one will select the ink and the substrate such that the ink has an MFFT below the temperature at which the substrate would deform, distort or melt. In this way, the ink can form a film on the substrate at a temperature which does not damage the substrate.

Although the present invention is of particular value for printing substrates which are non-absorbent and/or temperature-sensitive, it may also be used to print substrates which are absorbent and/or not temperature-sensitive. For such substrates the present inks and processes offer the advantage of providing prints having good rub-fastness properties at lower temperatures than used in prior processes, thereby reducing manufacturing costs.

Examples of non-absorbent substrates include polyester, polyurethane, bakelite, poly vinyl chloride, nylon, polymethyl methacrylate, polyethylene terephthalate, polypropylene, acrylonitrile-butadiene-styrene, polycarbonate, a blend of about 50% polycarbonate and about 50% acrylonitrile-butadiene-styrene, polybutylene terephthalate, rubber, glass, ceramic and metal.

If desired the substrate may be pre-treated in order to enhance adhesion of the ink thereto, e.g. using plasma, corona discharge or surfactant treatment. For example the substrate may be roughened, or it may be coated with an ink receptive coating.

The inks of the present invention also provide good light fastness.

In one embodiment the process further comprises drying the ink applied to the substrate at a temperature of at most 70° C., more preferably at most 65° C., especially at most 60° C.

According to a third aspect of the present invention there is provided an ink jet printer tank (e.g. a cartridge or a larger ink container), and an ink jet printer, comprising an ink as defined in the second aspect of the present invention Preferably the printer further comprises a means for heating a substrate to which the ink has been applied. This heating can be very useful for coalescing the latex, thereby entrapping the pigment in a film formed on the substrate.

Heat may be applied to either side or both sides of the substrate, for example by the use of heated plates (resistive heaters, inductive heaters) provided on the opposite side of the substrate to the image or radiant heaters (heater bars, IR lamps, solid state IR) provided on the same side as the printed image. Heated fuser belts and/or rollers may also be used.

The invention is further illustrated by the following Examples in which all parts and percentages are by weight unless otherwise stated.

EXAMPLES 1 to 4

Stage a)—Preparation of Latex Binders
Latex Binder 1 (Tg of 50° C.) ("LB1")

Latex Binder 1 was synthesised by emulsion polymerisation. The monomers used were styrene (74.9 wt %), 2-hydroxyethyl methacrylate (2.5 wt %) and (meth)acrylic ester monomers (22.6 wt %) (18.4% butyl acrylate and 4.2% methyl methacrylate). Ammonium persulphate (0.5 wt % based on weight of monomers) was used as the initiator, and a mixture of thiol chain transfer agents (2.5 wt % based on weight of monomers) was used as chain transfer agents. The surfactant (3 wt % based on weight of monomers, i.e. 3 wt pts surfactant for 100 wt pts monomers) was Akypo™ RLM100 (available from Kao), a carboxylated alkyl ethoxylate, i.e. a carboxy-functional anionic surfactant. The latex produced had a resin particle size of 119 nm as measured by a Coulter™ LS230 Laser Diffraction Particle Size Analyser. A sample of the latex was dried down for Differential Scanning calorimetry (DSC) and Gel Permeation Chromatography (GPC) analysis. The glass transition temperature (Tg) as measured by DSC was 50° C. GPC analysis against polystyrene standards showed the latex binder to have Mn=5,100, Mw=20,900, Mw/Mn=4.10. The solids content of the latex binder was 29.4 wt %.

Latex Binder 2 (Tg of 57° C.) ("LB2")

A latex binder was synthesised by emulsion polymerisation in a similar manner to Latex Binder 1 above but using a higher proportion of styrene in the monomer mixture and less (meth)acrylic ester monomers. The resultant latex had a particle size of 119 nm as measured by a Coulter™ LS230 Laser Diffraction Particle Size Analyser. A sample of the latex was dried down for DSC and GPC analysis. The glass transition temperature (Tg) as measured by DSC was 57° C. GPC analysis against polystyrene standards showed the resin of the latex to have Mn=5,800, Mw=21,200, Mw/Mn=3.66. The solids content of the latex was 30.0 wt %.

Stage b)—Preparation of Polymer-Encapsulated Pigments

Polymer-encapsulated pigments were prepared and purified as described in WO10/038,071, Table 1, using the crosslinking agents described in that Table.

Stage c)—Preparation of Inks

Inks 1 to 4 may be prepared by mixing the ingredients indicated in Table 1. References to "Encapsulated Magenta Dispersion (1)" etc. refer to the polymer-encapsulated pigments of the same name described in WO10/038,071, Table 1. The number of parts of each component is stated in brackets at the end of the component name.

TABLE 1

| Ingredient | Example (parts) | | | |
|---|---|---|---|---|
| | Ink 1 | Ink 2 | Ink 3 | Ink 4 |
| latex binder | LB1 (5) | LB2 (7) | LB1 (4.5) | LB2 (9) |
| polymer-encapsulated Pigment | Encapsulated Black Dispersion (1) (5) | Encapsulated Magenta Dispersion (1) (2) | Encapsulated Yellow Dispersion (1) (3) | Encapsulated Cyan Dispersion (1) (2.5) |
| water | (59.5) | (65) | (68.75) | (62.5) |
| ethylene glycol | (10) | (11) | (5) | (2) |
| diethylene glycol | | | (5) | (5) |
| glycerol | | | | (4) |
| 1,2-hexanediol | | | (0.5) | |
| 2-pyrrolidinone | (5) | (5) | (4) | (3) |
| triethyleneglycol monobutyl ether | (5) | | | |
| butyl cellosolve | (10) | | | (11) |
| propylene glycol propyl ether | | | (8.5) | |
| diethylene glycol monobutyl ether | | (9) | | |

TABLE 1-continued

| Ingredient | Ink 1 | Ink 2 | Ink 3 | Ink 4 |
|---|---|---|---|---|
| Surfynol ™ 104e | (0.5) | | | (1) |
| Surfynol ™ 465 | | (1) | (0.75) | |

Note:
the number of parts of latex binder and polymer-encapsulated pigment are stated on a 100% solids basis.

Stage d)—Printing

The inks described in Table 1 may be loaded into separate empty chambers of an ink jet printer cartridge and printed onto polypropylene substrate. The prints may then be heated at a temperature of 60° C. for 5 minutes using an infrared light source in order to form a film on the substrate.

EXAMPLES 5 to 8 AND COMPARATIVE EXAMPLES C1 to C5

In the following Examples, z-average particle sizes were measured using a Zetasizer from Malvern Instruments. Tg was measured by drying down a sample of the latex and measurement using Differential Scanning calorimetry (DSC). Mn and Mw were determined using Gel Permeation Chromatography analysis against polystyrene standards.

Latex Binder 3

Latex Binder 3 was synthesised by emulsion polymerisation. The monomers used were styrene (58.8 wt %), butyl acrylate (33.0 wt %), methyl methacrylate (4.2 wt %) and 2-hydroxyethyl methacrylate (4.0 wt %). Ammonium persulphate (0.5 wt % based on weight of monomers) was used as the initiator. The surfactant (2 wt % based on weight of monomers, i.e. 2 wt pts surfactant for 100 wt pts monomers) was sodium dodecylbenzenesulphonate, i.e. a sulphonate-functional anionic surfactant.

Latex Binder 3 had a resin z-average particle size of 94 nm, a Tg of 48° C., Mn of 12,800, Mw of 210,000 and a solids content of 29.4 wt %.

Latex Binder 4

Latex Binder 4 was synthesised in a similar manner to Latex Binder 3, except the monomers used were styrene (91.8 wt %), methyl methacrylate (4.2 wt %) and 2-hydroxyethyl methacrylate (4.0 wt %).

Latex Binder 4 had a resin z-average particle size of 106 nm, a Tg of 104° C., Mn of 9,700, Mw of 113,400 and a solids content of 29.2 wt %.

Latex Binder 5

Latex Binder 5 was synthesised in a similar manner to Latex Binder 3, except the monomers used were styrene (87.0 wt %), butyl acrylate (4.8 wt %), methyl methacrylate (4.2 wt %) and 2-hydroxyethyl methacrylate (4.0 wt %).

Latex Binder 5 had a resin z-average particle size of 107 nm, a Tg of 95° C., Mn of 10,500, Mw of 162,700 and solids content of 29.2 wt %.

Polymer-Encapsulated Pigment Particles

PEP 1 was Pro-Jet™ Black APD1000 from FUJIFILM Imaging Colorants Limited.

CAB-O-JET™ 300

CAB-O-JET™ 300 was a pigment dispersion having a 15 wt % solids content from Cabot Corporation. The amount mentioned in the tables below is on a 100% solids basis.

Ink Preparation and Results

Inks 5 to 8 and Comparative Inks C1 to C5 were prepared by mixing the ingredients shown in Table 2. The inks were printed onto the substrates described in Table 3 using an Epson SX218 piezo ink jet printer. The resultant prints were dried at 40° C. for 10 minutes and then further heated in a press at 60° C. for 4 minutes to give dried prints. The dried prints were subjected to three or four tests as follows:

"Dry"—the dried print was rubbed with a dry, gloved finger and the degree of smearing from the printed to non-printed area was scored.

"Wet"—highlighter pens containing neutral, acidic and alkaline solutions were run over the dried prints. The degree of smearing from the printed to non-printed area was scored and the average score of the three pens (neutral, acidic and alkaline) was calculated.

"Peel"—tape was applied firmly to the dried print and then the tape was peeled back with a steady pull parallel to the substrate. The extent to which the dried print was removed by the tape was scored.

"Wicking"—this test was relevant only to the Building Wrap because this substrate had a woven structure along which the ink could wick. The extent to which the ink wicked along the Building Wrap was scored.

The above scoring was on a 1-5 scale, with 1 being excellent resistance and 5 meaning bad failure. The results are shown in Table 3 below.

TABLE 2

| Ingredient | Ink 5 | Ink 6 | Ink 7 | Ink 8 | Ink C1 | Ink C2 | Ink C3 | Ink C4 | Ink C5 |
|---|---|---|---|---|---|---|---|---|---|
| Latex Binder | 3 (2) | 3 (2) | 4 (2) | 5 (2) | None | 4 (2) | 3 (2) | 4 (2) | 5 (2) |
| Pigment Dispersion | PEP 1 (2) | PEP 1 (2) | PEP 1 (2) | PEP 1 (2) | PEP 1 (2) | PEP 1 (2) | CAB-O-JET 300 (2) | CAB-O-JET 300 (2) | CAB-O-JET 300 (2) |
| Water | (59.8) | (65.8) | (59.8) | (59.8) | (61.8) | (65.8) | (59.8) | (59.8) | (59.8) |
| 2-Pyrrolidone | (16) | (0) | (16) | (16) | (16) | (0) | (16) | (16) | (16) |
| Ethylene Glycol | (0) | (10) | (0) | (0) | (0) | (10) | (0) | (0) | (0) |
| PGPE | (10) | (10) | (10) | (10) | (10) | (10) | (10) | (10) | (10) |
| 2-ethoxy ethanol | (10) | (10) | (10) | (10) | (10) | (10) | (10) | (10) | (10) |
| Zonyl ™ FSO | (0.2) | (0.2) | (0.2) | (0.2) | (0.2) | (0.2) | (0.2) | (0.2) | (0.2) |
| MFFT <70° C.? | Y | Y | Y | Y | N | N | Y | Y | Y |

Note: Latex Binder 3(2) means that two parts of Latex Binder 3 was used.

PGPE is propylene glycol mono-propyl ether

CAB-O-JET is a trade mark of Cabot Corporation.

MFFT<70° C.?: each ink indicated in Table 2 was tested by placing approximately 1 ml of the ink in an aluminium dish of diameter approximately 5 cm and heating the dish containing the ink at 70° C. for 24 hours then rubbing the surface with a gloved finger. The inks were scored as follows: Y=coherent film formed with no colour transfer onto the glove, N=coherent film not formed and/or significant colour transfer occurred onto the glove.

TABLE 3

Results

| Ink | Latex Binder | Pigment Dispersion | MFFT <70° C.? | Power Vinyl Gloss | | | Building Wrap | | | | Total score |
|---|---|---|---|---|---|---|---|---|---|---|---|
| | | | | Dry | Wet | Peel | Dry | Wet | Peel | Wicking | |
| 5 | 3 | PEP 1 | Y | 1 | 1 | 1 | 1 | 1.5 | 1.5 | 1.5 | 8.5 |
| C1 | None | PEP 1 | N | 2 | 2 | 2 | 1 | 4 | 3 | 5 | 19.0 |
| C3 | 3 | CAB-O-JET 300 | Y | 2 | 2 | 1 | 1 | 1.5 | 3 | 1.5 | 12.0 |
| 6 | 3 | PEP 1 | Y | 1 | 1.5 | 1 | 1 | 1.5 | 2 | 3 | 11.0 |
| C2 | 4 | PEP 1 | N | 2 | 3 | 5 | 1 | 3.5 | 4 | 5 | 23.5 |
| 7 | 4 | PEP 1 | Y | 1 | 1 | 1 | 1 | 3 | 2.5 | 4 | 13.5 |
| C4 | 4 | CAB-O-JET 300 | Y | 1 | 2 | 1 | 1 | 4 | 5 | 3 | 17.0 |
| 8 | 5 | PEP 1 | Y | 2 | 1 | 2 | 1 | 3.5 | 2.5 | 4 | 16.0 |
| C5 | 5 | CAB-O-JET 300 | Y | 1 | 3 | 2 | 4 | 4.5 | 4 | 3 | 21.5 |

Table 3 shows that for a given ink vehicle, a combination of ink MMFT <70° C. and a polymer-encapsulated pigment particle as defined provides good overall results.

Power Vinyl Gloss is a self-adhesive, temperature-sensitive vinyl substrate from Euromedia.

Building Wrap is a temperature-sensitive polyethylene building wrap material.

The invention claimed is:

1. A process for printing a substrate comprising applying thereto an ink comprising a latex binder, a liquid medium comprising water and organic solvent, and polymer-encapsulated pigment particles comprising a carboxy-functional dispersant crosslinked around a pigment core by a crosslinking agent, wherein the ink has an MFFT below 70° C.

2. The process according to claim 1 comprising applying the ink to the substrate by means of an ink jet printer.

3. The process according to claim 1 wherein the substrate is a temperature-sensitive substrate.

4. The process according to claim 2 wherein the substrate is a temperature-sensitive substrate.

5. The process according to claim 1 wherein the substrate is a substrate which would deform, distort or melt at a temperature below 70° C.

6. The process according to claim 1 wherein the ink and the substrate are selected such that the ink has an MFFT below the temperature at which the substrate would deform, distort or melt.

7. An ink comprising a latex binder, a liquid medium comprising water and organic solvent, and polymer-encapsulated pigment particles comprising a carboxy-functional dispersant crosslinked around a pigment core by a crosslinking agent, wherein the ink has an MFFT below 70° C.

8. The ink according to claim 7 wherein the dispersant, prior to crosslinking, has an acid value of from 135 to 250 mg KOH/g and the crosslinking agent has at least two epoxy groups.

9. The ink according to claim 7 wherein the carboxy-functional dispersant comprises benzyl methacrylate and the average particle size of the latex binder is at least 50 nm.

10. The ink according to claim 7 wherein the carboxy-functional dispersant comprises benzyl methacrylate.

11. The ink according to claim 7 wherein the carboxy-functional dispersant comprises benzyl methacrylate, the dispersant, prior to crosslinking, has an acid value of from 135 to 250 KOH/g, the average particle size of the latex binder is at least 50 nm and the crosslinking agent has at least two epoxy groups.

12. The ink according to claim 7 wherein the average particle size of the latex binder is at least 50 nm.

13. The ink according to claim 7 which comprises:
  (i) 0.1 to 10 parts of the polymer-encapsulated pigment particles comprising a carboxy-functional dispersant crosslinked around a pigment core by a crosslinking agent;
  (ii) 1 to 20 parts of latex binder;
  (iii) 5 to 60 parts of organic solvent; and
  (iv) 20 to 80 parts of water;
  wherein all parts are by weight and the ink has an MFFT below 60° C.

14. The ink according to claim 11 which comprises:
  (v) 0.1 to 10 parts of the polymer-encapsulated pigment particles comprising a carboxy-functional dispersant crosslinked around a pigment core by a crosslinking agent;
  (vi) 1 to 20 parts of latex binder;
  (vii) 5 to 60 parts of organic solvent; and
  (viii) 20 to 80 parts of water;
  wherein all parts are by weight and the ink has an MFFT below 60° C.

15. An ink jet printer tank comprising an ink as defined in claim 7.

16. An ink jet printer comprising an ink as defined in claim 13.

17. An ink jet printer comprising an ink as defined in claim 12.

* * * * *